UNITED STATES PATENT OFFICE.

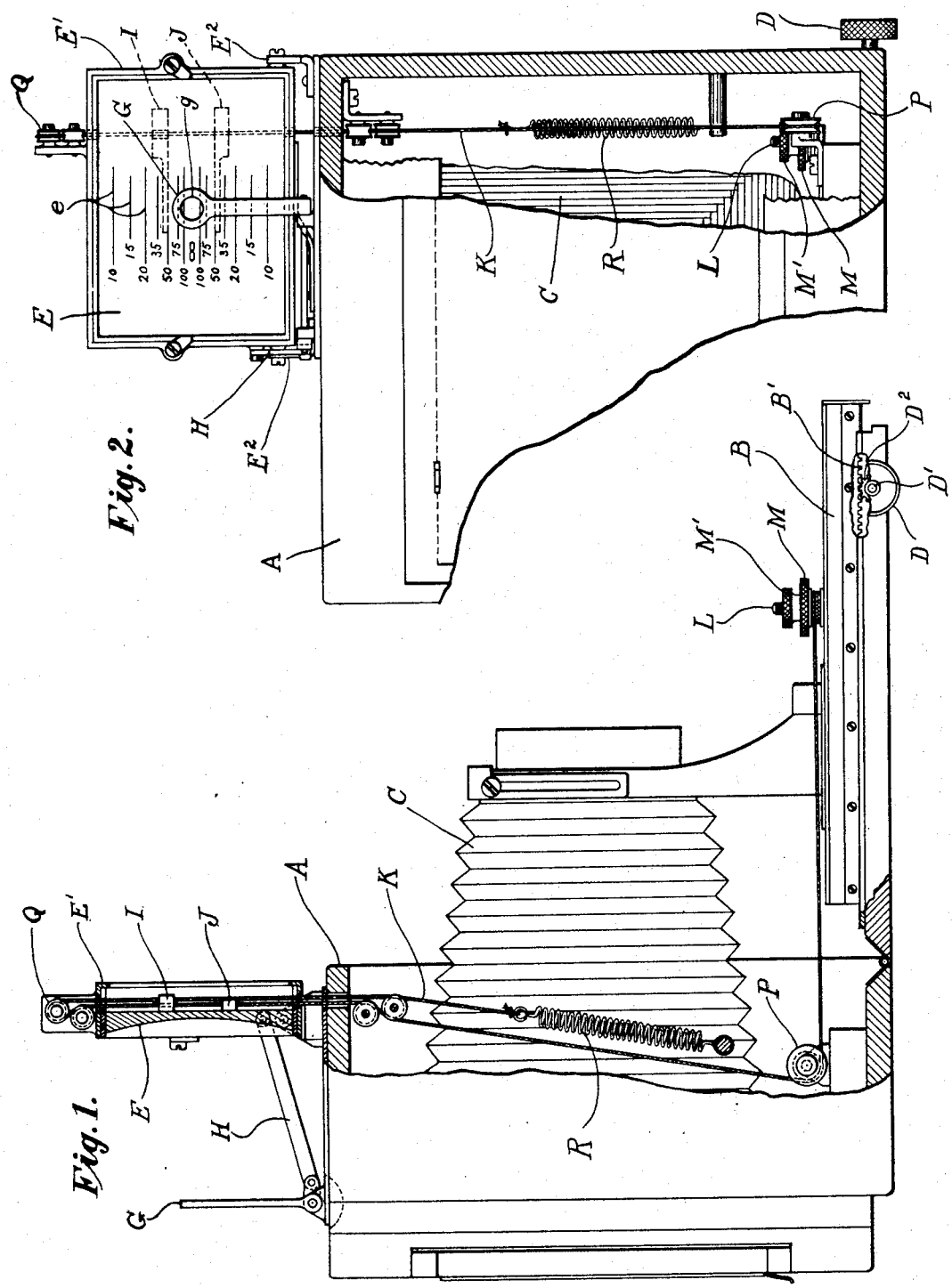

GUSTAV VOGT, OF NEW YORK, AND GUSTAV DIETZ, OF YONKERS, NEW YORK; SAID DIETZ ASSIGNOR TO SAID VOGT.

PHOTOGRAPHIC CAMERA.

No. 926,912.   Specification of Letters Patent.   Patented July 6, 1909.

Application filed March 2, 1908. Serial No. 418,876.

*To all whom it may concern:*

Be it known that we, GUSTAV VOGT, a citizen of the United States, residing in the borough of the Bronx, in the city and State of New York, and GUSTAV DIETZ, a citizen of the United States, residing in Yonkers, in the county of Westchester, in the State of New York aforesaid, have invented a certain new and useful Improvement in Photographic Cameras, of which the following is a specification.

The improvement relates to provisions for focusing.

We have discovered improved means for attaining the desired mechanical connection of the finder with the lensboard. It has long been attempted to make the focusing automatic by provisions for determining the angle subtended by a familiar object as a man or a horse at the required distance. We adopt that general mode of operating.

The following is a description of what we consider the best means of carrying out the invention.

The accompanying drawings form a part of this specification.

Figure 1 is a side elevation partly in longitudinal section on a line 1—1 in Fig. 2 and Fig. 2 is an end elevation partly in cross section on the line 2—2 in Fig. 1.

Similar letters of reference indicate like parts in both the figures.

A, is a camera of an ordinary construction. B, the sliding adjustable portion which carries the objective lens and C, the bellows, all of which and the other parts not fully described, may be of an ordinary and long approved character.

D, is a knob on the end of a shaft $D^1$ which extends across the camera and operates by a spur-wheel $D^2$ which engages with a rack $B^1$ on the under side of the slide B. By turning this the lensboard may be moved and the focus may be changed as little or much as required in either direction.

E is a concave lens which may be of the size and quality ordinarily used for the "finder" except that it is graduated with horizontal lines $e$ spaced unequally. These lines are nearer together at the mid-height. The spaces increase above and below as will presently be explained. This lens is mounted in the frame $E^1$ hinged to the camera at $E^2$ so that it can fold down when not required for use.

G is an eye-piece or "sight," a light bar of metal provided with a sight hole $g$ near its upper end and hinged to the top of the camera at a proper distance from the finder E. This sight is adapted to fold toward the finder and is connected therewith by a link H properly knuckled to each so that pressing the finder rearward will fold down both the finder and the sight. When these parts are folded down the part G lies underneath and the part E lies over it. The two, with the link which connects them, occupy but a small, flat, space on the top of the camera.

It has been long known and practiced in other arts to determine distances approximately by means of the varying angle at which an object is presented in the field of view. For our purpose we can use a man, a horse or, in the case of ordinary dwellings, a window, all these being sufficiently near a uniform height of 5 or 6 feet to serve our purpose. The lines $e$ are carefully placed on the lens E at such distance apart graduated according to well understood laws of optics that either of these objects viewed through the sight orifice $g$ will indicate by its matching to the several lines, what the distance is, of the man, the animal, or the window. The operator will be able, by means of this invention so far as yet described, to focus his instrument rapidly and with approximate correctness,—observing the object through this indicating device,—the peculiarly graduated lens, and next with the information thus obtained adjusting the focus of his instrument by the ordinary means,—a separate operation, quicker than the ordinary and with less mental labor but still requiring some of the latter.

We have added to the above a further improvement to which we attach special importance; a mechanical connection of the sliding part B with the two indices so arranged that when the operator turns the knob D in the direction to slide the objective B outward the two indices will be correspondingly moved apart and when the operator turns the knob D in the direction to draw the objective inward, the indices will correspondingly move toward each other. As the invention is carried out in these figures K is a slender cord of silk or other strong and sufficiently flexible material. One end is secured adjustably in a spool carried on the slide B and operated by hand, clamped by a milled-headed nut M¹ applying on a screw L. The cord K extends therefrom under a pulley P mounted on a stationary portion of the camera. From this pulley it extends upward and is attached to the lowermost index J. From this index it extends up over a pulley Q above the finder and thence downward and is attached to the uppermost index I. From this the cord further extends downward and is maintained in an extended condition by a gentle tensile spring R. When the objective is drawn in and put out of use, the indices may move quite together, the spring R urging the index I downward and the index J upward. But whenever the instrument is brought into condition for use, the movement of the objective outward acting through the connecting cord K, raises the index I and lowers the index J always to an equal extent and always just corresponding to the extent to which the objective is moved outward.

It will be seen that the care and intellectual labor required of the operator is small. The two indices I and J may have much extension horizontally as shown and the window or animal or other object, preferably a man in erect position when such is available, may be brought by the proper adjustment into the space between the indices, and will indicate whether the distance is 10 feet, 50 feet or more. We will now call attention to what we esteem far more important. The invention will insure that the objective is in the correct position for producing a clear and sharp image at the distance whatever it may be. All that is necessary is to open the camera including the raising of the finder E and to look through the eye piece G at the field, to turn the knob D or by other means move the lensboard until the indices I and J come in line of sight with the head and foot of a man or horse which may chance to be at the distance required and make the exposure. The graduations e are not essential, still less important are the figures engraved or otherwise produced near them. Judgment will be required in the operator to allow for a difference when the window or other object which is depended on to give the focal length required, is more distant from or nearer to the eye than the principal objects which it is desired to depict.

The thickness of the cord K may be varied but it is important that the cord be flexible so that it can effect the movements of the indices apart and together with exactness and allow the finder and its accompanying parts to be folded down when the camera is out of use. The precise amount of tension exerted by the spring R is not of much importance. Risk of errors from the stretch of the cord is slight but we have provided for an adjustment of the mechanical connection. All that is necessary to increase the distance apart of the indices I and J for all positions of the objective, is to take up the length of the cord K by slackening the nut M¹ and winding up a sufficient length of cord by turning the part M and tightening the nut again.

We claim as our invention:

1. The combination of a lensboard, a concave finder, movable indexes on the finder, and a connection of the movable indexes with the lensboard, this connection being adjusted so that if the known object as a man (no matter what distance away) is kept between the two indexes on the finder by the movement of the lensboard and lens, the lens is set to proper focus for the object.

2. In a photographic camera a movable lensboard and means for operating it, a finder lens suitably mounted and hinged in combination with two parallel indices carried thereon adapted for being moved apart and together to indicate the angle of a known object and a mechanical connection of these parts adapted to insure a correspondence of adjustment and to allow of folding, combined and arranged to serve as herein specified.

3. In a photographic camera a movable lensboard and movable indices all connected by a flexible cord in combination with a finder lens mounted in a frame hinged for folding and arranged to carry the indices as herein specified.

4. In a photographic camera a movable lensboard and movable indices connected therewith by a flexible cord, in combination with a spool and clamp nut adapted to allow the connecting cord to be adjusted at will as herein specified.

5. In a photographic camera a finder lens foldably attached in combination with a sight-bar hinged and arranged to be folded under the finder, and a link connected to each, all adapted to serve, substantially as herein specified.

Signed at New York, New York this 11 day of February 1908.

GUSTAV VOGT.
GUSTAV DIETZ.

Witnesses:
AL. H. GRAHAM,
ARTHUR P. MARR.